2,939,076
Patented May 31, 1960

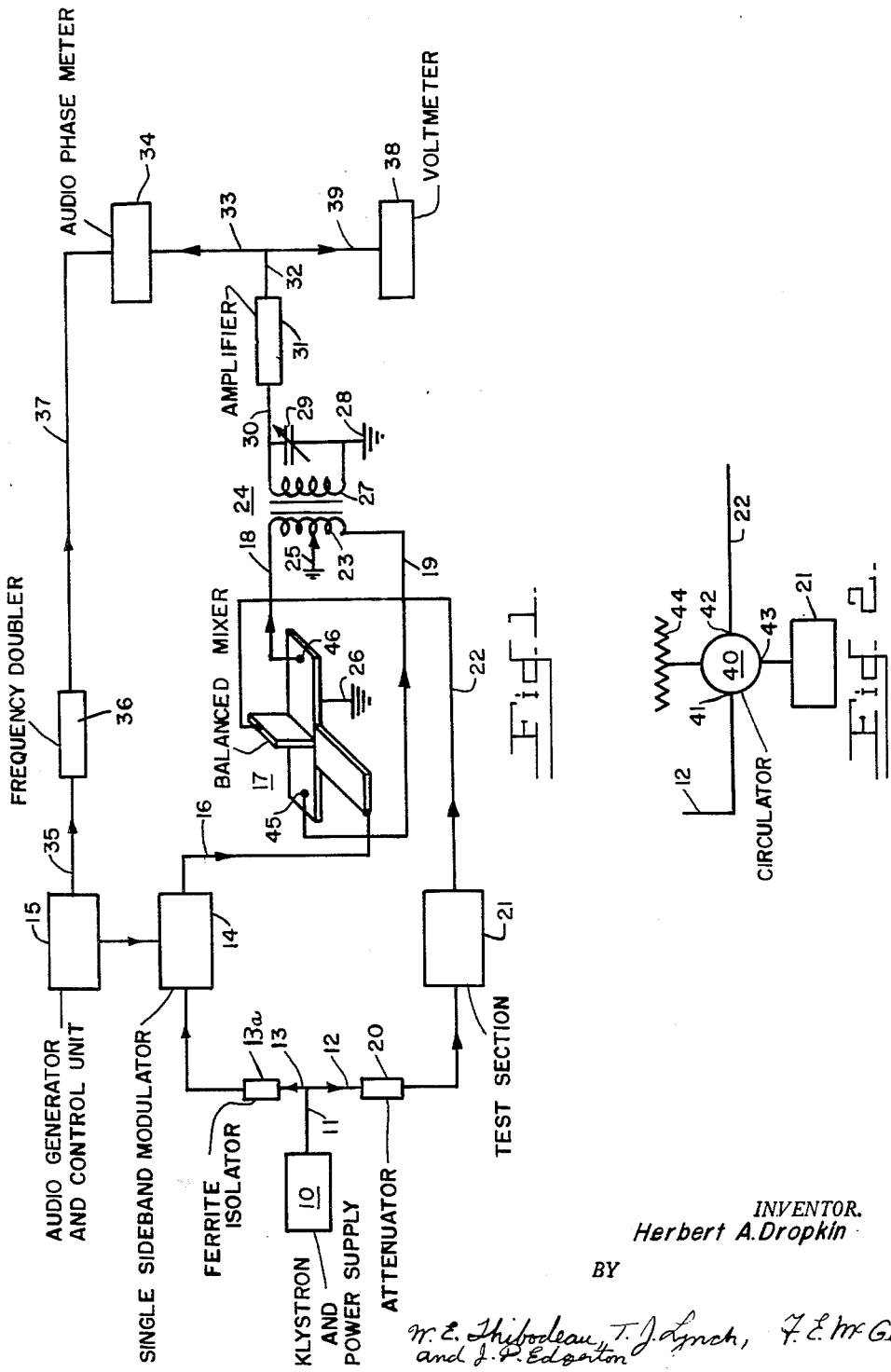

2,939,076

MICROWAVE AMPLITUDE AND PHASE MEASUREMENT

Herbert A. Dropkin, Washington, D.C., assignor to the United States of America as represented by the Secretary of the Army Filed Mar. 6, 1957, Ser. No. 644,424

9 Claims. (Cl. 324—58)

(Granted under Title 35, U.S. Code (1952), sec. 266)

The invention described herein may be manufactured and used by or for the Government for governmental purposes without the payment to me of any royalty thereon.

This invention relates to microwave energy testing means and in particular to means for directly reading the phase angle and the attenuation of a wave guide section inserted in a wave guide for examination of its properties.

It is an object of this invention to provide means whereby the phase angle and loss of a specimen section of waveguide inserted in a waveguide system may be compared immediately by direct reading meters against the known properties of a standard waveguide section.

It is an object of this invention to provide means whereby a waveguide system is subjected to a first stream of microwave energy at a given frequency and to a second stream of microwave energy shifted from said given frequency by an audio frequency, and to use the two streams in connection with a phase meter and a voltmeter to read directly the phase angle and the attentuation of a waveguide section inserted in the waveguide system.

It is an object of this invention to provide direct reading means of the phase shift of a section of waveguide with such means comprising a balanced mixer fed with microwave energy of a given microwave frequency and with a signal of the given frequency shifted by an audio frequency, and with the output of the balanced mixer fed to a phase meter to indicate the phase angle of a section of waveguide inserted in the waveguide system.

It is an object of this invention to provide direct reading means of the attenuation or reflection of a section of waveguide in a waveguide system, with such means comprising a balanced mixer fed with a microwave signal of a given frequency and with a signal of the given frequency shifted by an audio frequency, and with the output of the balanced mixer fed to a voltmeter to indicate the attenuation or reflection of the section of waveguide.

The specific nature of the invention as well as other objects, uses and advantages thereof will clearly appear from the following description and from the accompanying drawing, in which:

Figure 1 is a wiring diagram of the invention.

Figure 2 is a modification of a part of the wiring diagram of Fig. 1.

In Figure 1 there is shown a source of microwaves of a desired given frequency, indicated generally at 10. The energy passes along line 11 and then divides to go along lines 12 and 13 of a waveguide system. Line 13 contains a ferrite isolator 13a of conventional form, and also contains a single sideband modulator 14 of the ferrite core type shown and described in patent application Serial No. 377,004 filed August 27, 1953, by Johan C. Cacheris and assigned to the Government. In the Cacheris application the microwave energy is passed through a ferrite modulator which has a coil fed with energy at an audio frequency, and the output has a frequency differing from the input microwave frequency by twice the input frequency to the coil.

Connected to the single-sideband modulator 14 is a source of alternating current 15 connected to the modulator to magnetize the ferrite core. In the experimental unit in the laboratory the frequency of the alternating current from source 15 was 10 kilocycles. The output from the modulator 14 passes along a guide section 16 to enter a balanced mixer 17 of conventional form, such as a magic tee which has crystal detectors 45 and 46 in its collinear arms. The input to the balanced mixer is indicated as entering the H-plane arm of the magic tee.

The guide section 12 contains an attenuator 20, and this attenuator is adjusted so that the energy in the line 12 is about one-tenth of that going to the modulator 14. Afer the energy passes through the attenuator 20 it enters the test section 21, and the output of the test section passes along line 22 to enter the magic tee at its E-plane arm. The test section 21 may contain various elements, and what is wanted is the knowledge of how these elements affect the attenuation and the phase shift of the test section.

The crystal detectors 45 and 46 are connected by wires 18 and 19 to the primary winding 23 of an audio frequency transformer 24, and the primary has an adjustable center tap 25 connected to ground. The waveguides themselves are connected to ground as indicated at 26. The econdary winding 27 of the transformer has one end connected to ground at 28, and a variable capacitor 29 is connected across this winding. The output line 30 from the transformer carries the audio frequency, and it may be connected to a conventional audio amplifier 31 and then by a wire 33 to a conventional audio phase meter 34. A wire 35 is connected to the control source 15, and a conventional frequency doubler is connected to this wire to increase the frequency to 20 kilocycles when the control frequency is 10 kilocycles, and this 20 kilocycles is fed to the phase meter by a wire 37.

A conventional vacuum tube voltmeter 38 is connected to the wire 33 by a wire 39.

The test section may be one in which reflection is the predominant feature. In order to determine this reflection in the test section a part of the system just described is modified as shown in Figure 2. A conventional circulator 40 is connected to the line 12 at 41, and its output is connected to the line 22 at 42. The test section 21 is connected to the circulator at 43, and the remaining arm 44 of the circulator is connected to dissipating means 44. The circulator is a non-reciprocal device using ferrite, and is conventional in the microwave art.

If we assume that the test section is a standard section of waveguide, the system can be adjusted so that the phase meter 34 reads some value and that the voltmeter 38 reads some value. Then, when we substitute for this standard section a section containing wave length changing means, the phase meter reading can be compared with the reading for the standard, and the new reading of the voltmeter is indicative of the attenuation of the test section as compared with the former reading.

For a constant input into the waveguide system, the voltmeter 38 can be calibrated to give the percentage transmission loss, for the voltmeter gives a reading proportional to the amplitude of the microwave signal emerging from the test section. The attenuation can thus be read directly as the various test sections are inserted in the system to determine their properties.

It is obvious that when the crystals 45 and 46 are fed through the H-plane arm they give rise to a D.C. output, and that adding the energy to the E-plane arm gives us a modulation of this D.C. output.

It will be apparent that the embodiments shown are only exemplary and that various modifications can be made in construction and arrangement within the scope of the invention as defined in the appended claims.

I claim:
1. Means for indicating the attenuation and phase angle of a section of a microwave guide whereby the attenuation and phase shift of a test section in the waveguide may be obtained, said means comprising a balanced mixer having a pair of connected input arms at a right angle to each other and having a pair of collinear arms, a crystal detector in each of said collinear arms, respectively, an audio transformer connected to said crystals, means to divide a stream of microwave energy of a given frequency into a first stream and a second stream, a test section of waveguide in said first stream, an output connection from said test section to an input arm of said balanced mixer, a single sideband modulator in said second stream to shift said microwave frequency by an audio frequency, control means to feed signals at audio frequency connected to said modulator, a connection from the output of said modulator means to another input arm of said balanced mixer, a voltmeter connected to the output of said audio transformer, a phase meter connected to the output of said audio transformer, and a frequency doubler connected to said control means and to said phase meter.

2. In the combination of claim 1, an attenuator connected in series in said first stream, and a ferrite isolator connected in series in said second stream.

3. Means for indicating the attenuation and phase angle of a test section of a microwave guide whereby the attenuation and phase shift of a test section in the waveguide may be obtained, said means comprising a balanced mixer having a pair of connected input arms at a right angle to each other and having a pair of collinear arms, a crystal detector in each of said collinear arms, respectively, an audio transformer connected to said crystals, means to divide a stream of microwave energy into a first stream and a second stream, a circulator in said first stream, a test section connected to said circulator, an output connection from said circulator to an input arm of said balanced mixer, a single-sideband modulator in said second stream to shift said microwave frequency by an audio frequency, control means to feed signals at audio frequency connected to said modulator means, a connection from the output of said modulator means to another input arm of said balanced mixer, a voltmeter connected to the output of said audio transformer, a phase meter connected to the output of said audio transformer, and a frequency doubler connected to said control means and to said phase meter.

4. In the combination of claim 3, an attenuator connected in series in said first stream, and a ferrite isolator connected in series in said second stream.

5. Means for determining the phase angle and the attenuation of a waveguide test section, said means comprising a microwave balanced mixer having an E-plane arm and an H-plane arm, and having a pair of collinear arms, crystal detectors in said collinear arms, a test section of waveguide, means to send a first stream of microwave energy of a given frequency through said test section to said H-plane arm, frequency-shifting means, control means connected to feed audio frequency energy to said frequency-shifting means, means to send a second stream of energy of the given frequency through said shifting means to said E arm, an audio frequency transformer connected to said crystals, a phase meter connected to the output side of said transformer, a frequency doubler connected to said control means and connected to said phase meter, and voltage indicating means connected to the output of said transformer.

6. In the combination of claim 5, an attenuator connected in series with said test section, and a ferrite isolator connected in series in said second stream.

7. Means for determining the phase angle and attenuation of a waveguide section, said means comprising a balanced mixer having a pair of input arms and having a pair of collinear arms, crystal detectors in said collinear arms, a section of waveguide, means to send a first stream of microwave energy through said section to one of said input arms, frequency-shifting means, control means connected to send audio frequency energy to said shifting means, means to send a second stream of energy of the given frequency through said shifting means to the other input arm of said balanced mixer, an audio frequency transformer connected to said crystals, a phase meter connected to the output side of said transformer, a frequency doubler connected to said control means and to said phase meter, and voltage indicating means connected to the output side of said transformer.

8. In the combination of claim 7, an attenuator connected in series in said first stream and a ferrite isolator connected in series in said second stream.

9. Means for determining the phase angle and attenuation of a waveguide section, said means comprising a balanced mixer having a pair of input arms and having a pair of collinear arms, crystal detectors in said collinear arms, a section of waveguide, means to send a first stream of microwave energy through said section of waveguide to one of said input arms, frequency shifting means, control means connected to said shifting means to send audio frequency energy to said shifting means, means to send a second stream of energy of the given frequency through said shifting means to the other input arm of said balanced mixer, an audio frequency transformer connected to said crystals, a voltage indicating device connected to the output side of said transformer, a phase meter connected to the output side of said transformer, and a source of audio frequency signal of a frequency equal to that of the audio frequency shift of said second stream connected to said phase meter.

References Cited in the file of this patent
UNITED STATES PATENTS

| | | |
|---|---|---|
| 2,767,374 | Slonczewski | Oct. 16, 1956 |
| 2,790,143 | Kyhl | Apr. 23, 1957 |
| 2,813,250 | Tyson | Nov. 12, 1957 |

OTHER REFERENCES

Alsberg: Bell Laboratories Record, "Phase Meas. for L Carrier Components," July 1950, pp. 307–312.